(12) United States Patent
Yoo et al.

(10) Patent No.: US 6,998,162 B2
(45) Date of Patent: Feb. 14, 2006

(54) OPTICAL RECORDING MEDIUM WITH PHASE TRANSITION LAYER AND METHOD OF MANUFACTURING THE OPTICAL RECORDING MEDIUM

(75) Inventors: In-kyeong Yoo, Kyungki-do (KR);
Soo-hwan Jeong, Kyungki-do (KR);
In-sook Kim, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 100 days.

(21) Appl. No.: 10/441,122

(22) Filed: May 20, 2003

(65) Prior Publication Data

US 2004/0096617 A1  May 20, 2004

(30) Foreign Application Priority Data

Nov. 18, 2002  (KR) ................. 10-2002-0071610

(51) Int. Cl.
*B32B 3/02*  (2006.01)

(52) U.S. Cl. ............... 428/64.1; 428/64.4; 428/64.5; 430/270.13

(58) Field of Classification Search ............. 428/64.1, 428/64.4, 64.5, 64.6, 913; 430/270.13, 495.1, 430/945
See application file for complete search history.

(56) References Cited

U.S. PATENT DOCUMENTS

| 5,368,986 A | | 11/1994 | Terao et al. |
| 5,747,180 A | | 5/1998 | Miller et al. |
| 5,789,055 A | * | 8/1998 | Yoon ..................... 128/64.1 |
| 5,906,874 A | * | 5/1999 | Takahashi et al. ......... 428/64.1 |
| 6,197,399 B1 | * | 3/2001 | Naito et al. ............... 428/64.1 |
| 2004/0028869 A1 | * | 2/2004 | Terao et al. ............... 428/64.4 |

FOREIGN PATENT DOCUMENTS

| EP | 1 058 247 A1 | 12/2000 |
| JP | 7311984 | 11/1995 |

OTHER PUBLICATIONS

Notice to Submit Response issued by the Korean Patent Office in corresponding application 10-2002-0071610 on Jun. 18, 2004.

* cited by examiner

*Primary Examiner*—Elizabeth Mulvaney
(74) *Attorney, Agent, or Firm*—Burns, Doane, Swecker & Mathis, LLP (57) ABSTRACT

An optical recording medium having a phase transition material film and a method of manufacturing the optical recording medium are provided. In the method, first, a phase transition material film, a sacrificial film, and a metal film are sequentially stacked on a substrate. Next, the metal film is anodized to form a metal oxide film having a plurality of holes, and portions of the sacrificial film exposed through the holes are anode-oxidized to form oxide films. Thereafter, the phase transition material film is patterned by removing the metal oxide film and by etching the sacrificial film and the phase transition material film using the oxide films as a mask. Then, the oxide films are removed from the sacrificial film, and an upper insulation film, a reflection film, and a protection film are deposited on the upper surface of the patterned phase transition material film. The optical recording medium can be simply manufactured by using a self-alignment method and can have a highly-integrated large-capacity memory.

45 Claims, 11 Drawing Sheets

OPTICAL RECORDING MEDIUM WITH PHASE TRANSITION LAYER AND METHOD OF MANUFACTURING THE OPTICAL RECORDING MEDIUM

BACKGROUND OF THE INVENTION

This application claims the priority of Korean Patent Application No. 2002-71610, filed on Nov. 18, 2002, in the Korean Intellectual Property Office, the disclosure of which is incorporated herein in its entirety by reference.

1. Field of the Invention

The present invention relates to an optical recording medium and a method of manufacturing the same, and more particularly, to an optical recording medium using a phase transition layer and a method of manufacturing the optical recording medium.

2. Description of the Related Art

In conventional optical recording media such as compact disks (CDs) or digital versatile disks (DVDs), a phase transition layer is deposited on a substrate, pits are formed on a specific spot by melting and cooling the specific spot by projecting laser beams thereinto, and data is recorded in the pits. Conventional optical recording media adopting this recording method have a technical limit in increasing the numerical aperture of a lens that focuses laser beams. Thus, conventional optical recording media also has a limit in increasing the recording density.

To solve these problems, U.S. Pat. No. 6,197,399 discloses a recording medium that can achieve recording without using laser beams and a method of manufacturing the recording medium.

Figure 1:
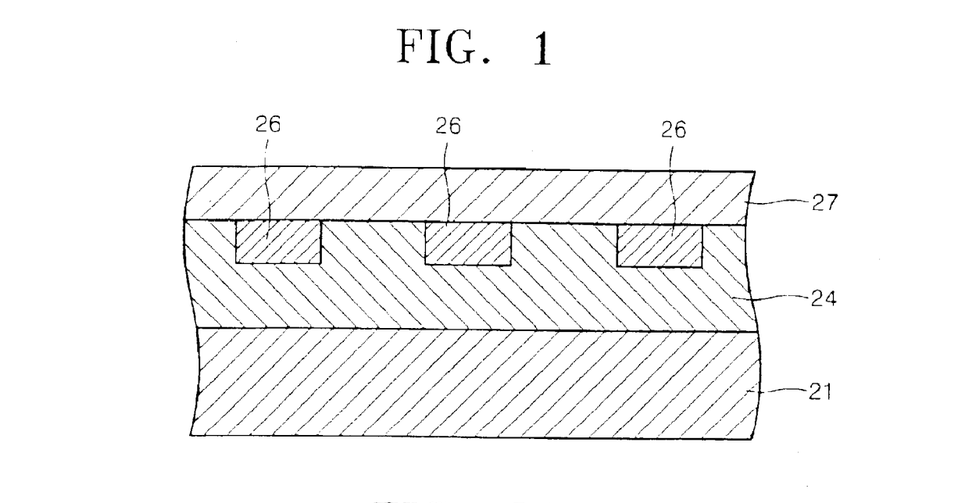
FIG. 1 is a cross-section of an optical recording medium disclosed in U.S. Pat. No. 6,197,399.

FIG. 1 is a cross-section of the recording medium disclosed in U.S. Pat. No. 6,197,399. First, a silicon substrate 21 with a 3-inch size and a 1.22 mm thickness undergoes a hydrochloric acid treatment to remove a natural oxide film from the silicon substrate 12, resulting in hydrogen atoms on the surface of the silicon substrate 21. Electron beams are projected into the resulting silicon substrate 21 so that a plurality of circular areas of 10 nm size each are regularly arranged at intervals of 30 nm thereon. Thereafter, the resulting silicon substrate 21 is left in an air atmosphere of a clean room for about an hour, and $SiO_2$ films are selectively formed on areas of the silicon substrate 21 that are exposed to the electron beams. Then, the resulting silicon substrate 21 undergoes another hydrochloric acid treatment to remove some of the $SiO_2$ films from the silicon substrate 21. As a result, pits with a 10 nm width and a 5 nm depth each are formed.

Doner organic dye molecules are vacuum-deposited on the upper surface of the resulting silicon substrate 21 to obtain a recording layer. Then, the resulting silicon substrate 21 having the recording layer formed thereon is heated about an hour at 80° C. in a nitrogen atmosphere. The resulting silicon substrate 21 is polished using 100 nm-sized silica particles at a room temperature to make the organic dye molecules to remain in selected pits, thereby forming recording domains 26. Thereafter, the resulting silicon substrate 21 is left to stand for about a day at 40° C. in an air atmosphere to form a $SiO_2$ film 24 on areas of the silicon substrate 21 that are not exposed to electron beams. A protection layer 27 is formed on the upper surface of the $SiO_2$ film by spin-coating the $SiO_2$ film with a compound composed of polyaniline and polyvinyl chloride. In this way, a recording medium is manufactured, and recording is performed by injecting positive charges (holes) into the dot-like recording domains by means of an atomic force microscope (AFM) probe coated with Au under an applied voltage of 30V.

In the manufacture of the recording medium disclosed in the above U.S. Patent, since a phase transition material, such as doner organic dye molecules, is formed by a hole filling operation, a process of removing the phase transition material from the silicon substrate must be performed after the hole filling operation, and a $SiO_2$ film, in which holes are formed, cannot be removed. Also, a process of heating the phase transition layer is required, and a substrate must only be formed of a material with a high melting point, such as, silicon or special glass.

SUMMARY OF THE INVENTION

The present invention provides a highly-integrated large-capacity optical recording medium that can fast record and reproduce data even by using a recording and reproducing method executed by a conventional optical recording medium producing and can be simply manufactured, and a method of manufacturing the highly-integrated large-capacity optical recording medium.

According to an aspect of the present invention, there is provided a method of manufacturing an optical recording medium. In the method, first, a phase transition material film, a sacrificial film, and a metal film are sequentially stacked on a substrate. Next, the metal film is anodized to form a metal oxide film having a plurality of holes, and portions of the sacrificial film exposed through the holes are anodized to form oxide films. Thereafter, the phase transition material film is patterned by removing the metal oxide film and by etching the sacrificial film and the phase transition material film using the oxide films of the sacrificial film as a mask. Then, the oxide films are removed from the sacrificial film, and an upper insulation film, a reflection film, and a protection film are deposited on the upper surface of the patterned phase transition material film.

A lower insulation film may be interposed between the substrate and the phase transition film.

According to an aspect of the present invention, there is provided another method of manufacturing an optical recording medium. In this method, first, a reflection film, a phase transition material film, a sacrificial film, and a metal film are sequentially on a substrate. Next, the metal film is anodized to form a metal oxide film having a plurality of holes, and portions of the sacrificial film exposed through the holes are anodized to form oxide films. Thereafter, the phase transition material film is patterned by removing the metal oxide film and by etching the sacrificial film and the phase transition material film using the oxide films of the sacrificial film as a mask. Then, the oxide films are removed from the sacrificial film, and an insulation film and a protection film are deposited on the upper surface of the patterned phase transition material film.

According to another aspect of the present invention, there is provided an optical recording medium including a substrate, a phase transition material film patterned on the substrate, an upper insulation film deposited on the substrate to cover the phase transition material film, a reflection film deposited on the upper insulation film, and a protection film formed on the upper surface of the reflection film.

A lower insulation film may exist between the substrate and the phase transition film.

According to another aspect of the present invention, there is provided another optical recording medium including a substrate, a reflection film deposited on the substrate, a phase transition material film patterned on the reflection film, an insulation film deposited on the reflection film to cover the phase transition material film, and a protection film formed on the upper surface of the insulation film.

The substrate has a land-groove structure in which lands are arranged alternately with grooves.

Preferably, the substrate is formed of any of PC, glass, and silicon.

The reflection film can be formed of an Al alloy or an Ag alloy. The phase transition material film can be formed of Ge—Te—Sb (GTS) or an alloy containing GTS.

The sacrificial film can be formed of Ta, and the metal film can be formed of Al or an Al alloy.

The insulation film can be formed of $SiO_2$—ZnS, and the protection film can be formed of PC.

The reflection film, the phase transition material film, the sacrificial film, the metal film, and the upper and lower insulation films are deposited using a chemical vapor deposition method or a sputtering method.

While the sacrificial film is oxidized, oxide films are grown within the holes of the metal film.

The phase transition material film has a matrix structure in which a plurality of nanodot columns are arranged, and preferably, has a honeycomb-like structure.

The present invention provides a highly-integrated optical recording medium with a phase transition material layer, by which fast data recording and reproduction can be achieved even by using an existing optical recording and reproducing method, and a method of manufacturing the highly-integrated optical recording medium.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

An optical recording medium according to the present invention and a method of manufacturing the optical recording medium will now be described fully hereinafter with reference to the drawings, in which embodiments of the invention are shown.

Figure 2A:
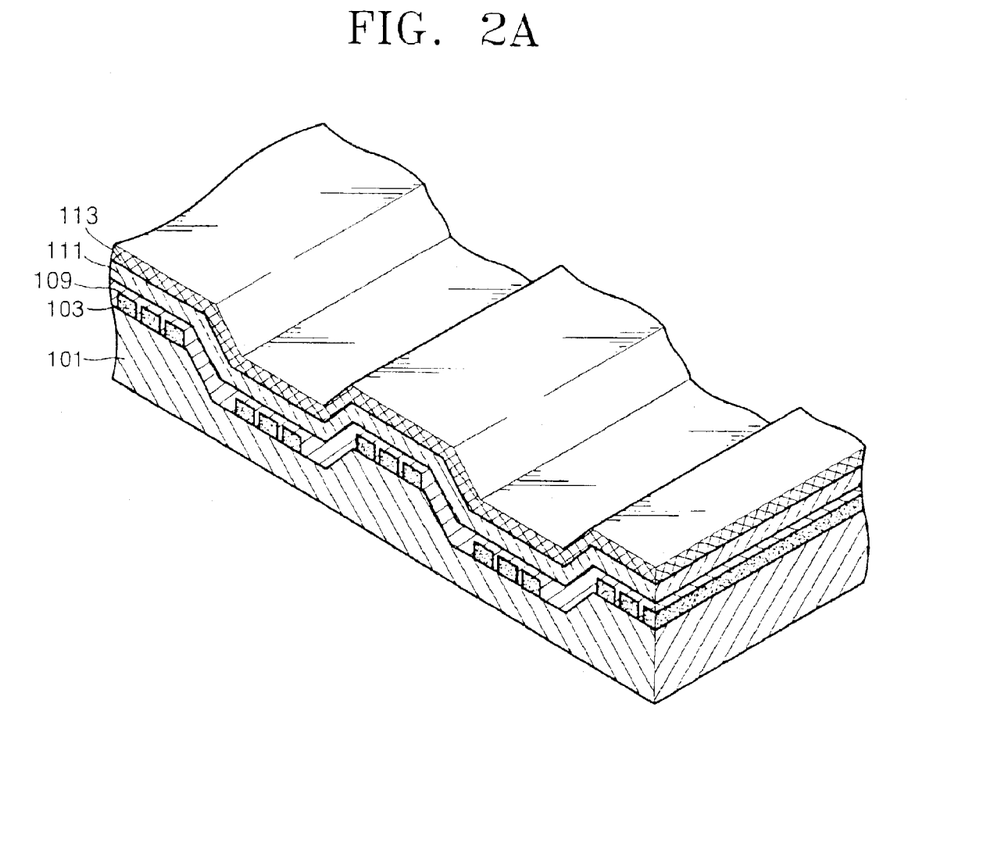
FIG. 2A is a perspective view of part of an optical recording medium according to a first embodiment of the present invention.
Figure 2B:
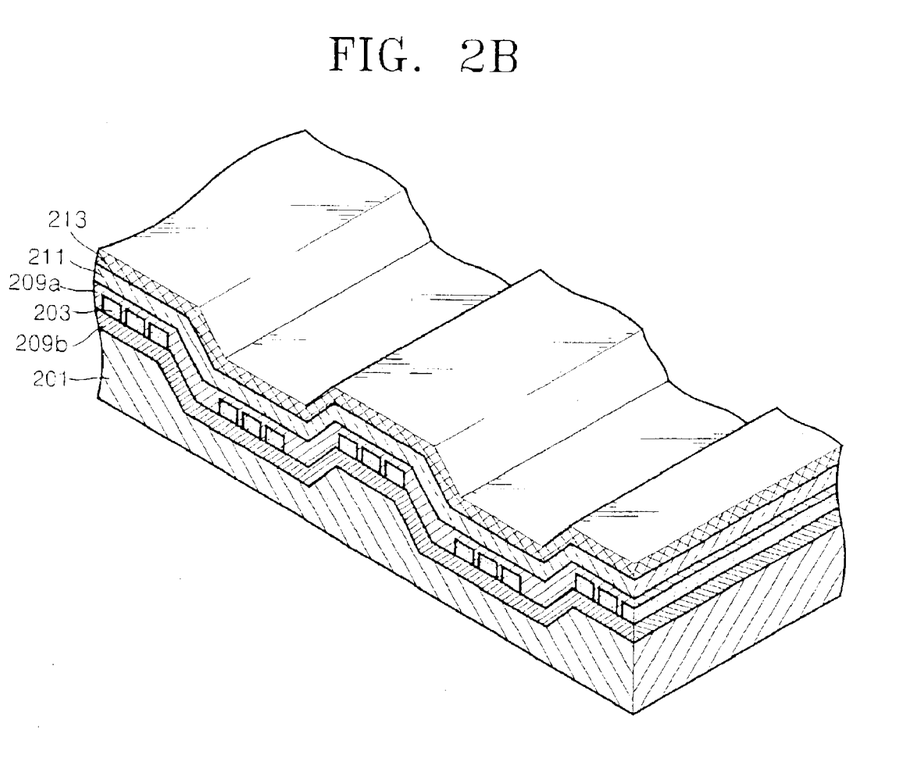
FIG. 2B is a perspective view of part of an optical recording medium according to a second embodiment of the present invention.
Figure 3:
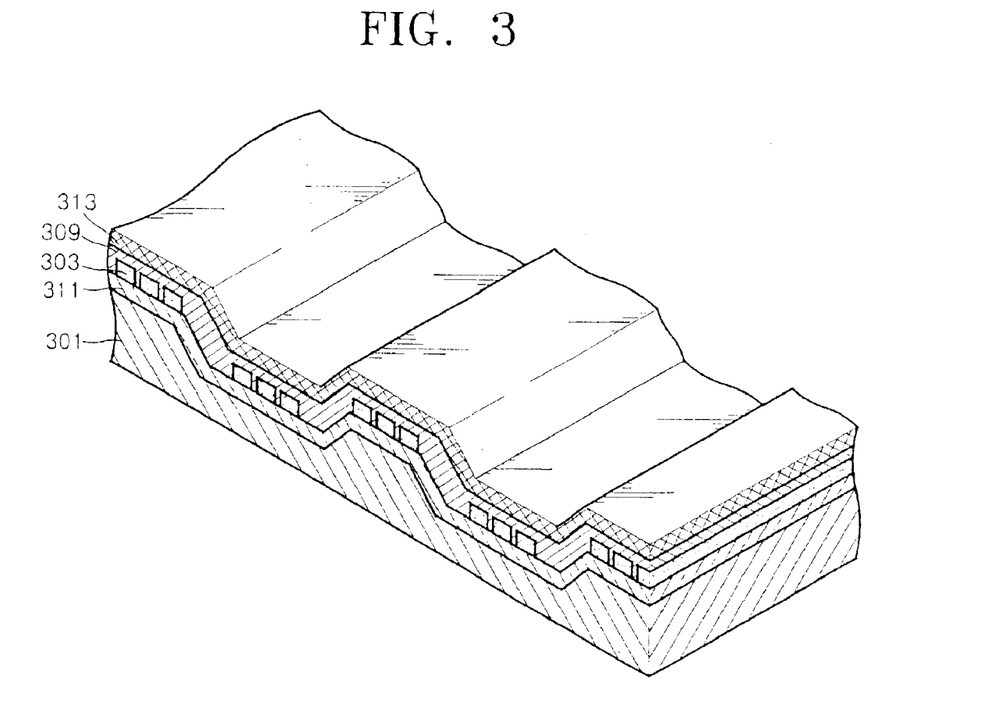
FIG. 3 is a perspective view of part of an optical recording medium according to a third embodiment of the present invention.

FIGS. 2A, 2B, and 3 are perspective views of parts of optical recording media according to the first, second, and third embodiments of the present invention.

Referring to FIG. 2A, in an optical recording medium according to a first embodiment of the present invention, a patterned phase transition material film 103 is placed on the upper surface of a transparent substrate 101 having lands and grooves. An insulating film 109 is deposited to cover the upper surface of the substrate 101 and the patterned phase transition film 103. A reflection film 111 and a protection film 113 are sequentially formed on the upper surface of the insulating film 109. The insulating film 109, the reflection film 111, and the protection film 113 each have a land-groove structure and are each deposited to the same thickness.

In the optical recording medium according to the first embodiment of the present invention, light emitted to record and reproduce data is incident on the transparent substrate 101, that is, incident on the rear surface of the optical recording medium, and passes through the transparent substrate 101. Light transmitted by the transparent substrate 101 is partially reflected or transmitted by the phase transition material film patterns 109. Light that passes through the phase transition material film patterns 109 and reaches the reflection film 111 is totally reflected by the reflection film 111, re-passes through the transparent substrate 101, and is detected by a photodetector (not shown).

Referring to FIG. 2B, an optical recording medium according to a second embodiment of the present invention is the same as the optical recording medium of FIG. 2A except that the former has a double-layer insulation film that is comprised of a lower insulation film 209b placed between a substrate 201 and a patterned phase transition material film 203 and an upper insulation film 209a that covers the patterned phase transition material film 203. In the optical recording medium according to the second embodiment of the present invention, if the substrate 201 is formed of polycarbonate, the lower insulation film 209b is preferably formed on the upper surface of the substrate 201. The optical recording medium according to the second embodiment of the present invention adopts a backward incidence method in which light radiated to record and reproduce data is incident on the transparent substrate 201.

FIG. 3 shows an optical recording medium according to a third embodiment of the present invention. In contrast with the first and second embodiments, a reflection film 311 in the optical recording medium according to the third embodiment is interposed between a substrate 301 and a patterned phase transition material film 303. In the third embodiment, light radiated to record and reproduce data is incident on a protection film 313 and passes therethrough. Light that is radiated from an optical pickup (not shown) and incident upon the protection film 313 is partially reflected or transmitted by the patterned phase transition material film 303 and reaches the reflection film 311. The light is reflected by the reflection film 311 to the protection film 313, emitted from the optical recording medium via the protection film 313, and detected by a photodetector (not shown).

If aluminum is anodized and patterned, each of the patterned phase transition material films 103, 203, and 303 has a honeycomb-like matrix structure in which nanodots are hexagonally arranged. However, if other materials such as silicon are patterned, each of the patterned phase transition material films 103, 203, and 303 has different-shaped matrix structure in which cylindrical nanodots are arranged in different shapes.

In contrast with a conventional optical recording medium having a continuous phase transition material film, the optical recording media according to the above embodiments of the present invention have patterned phase transition material films formed on lands and grooves, such that data is recorded with a high recording density. Thus, the optical recording media according to the above embodiments of the present invention can have a large memory capacity.

The optical recording media according to the above embodiments of the present invention record and reproduce data in the same way as the way existing CDs or DVDs record and reproduce data. To be more specific, when an optical pickup receives a signal associated with data to be recorded, the optical pickup moves over a predetermined area of an optical recording medium and projects light onto the predetermined area. The light is focused on the nanodots of a phase transition material film that exist on the desired spot in which information is to be recorded. After heating the phase transition material film, the heated phase transition material film is cooled, and accordingly, the amorphous state of the phase transition material film is changed to a crystalline state, resulting in a change in the reflectance. The difference of the reflectance between the phase transition material film in amorphous state and the phase transition material film in the crystalline state occurs is processed to recorded information.

Upon data reproduction, the phase transition layer is irradiated with light, and an optical signal reflected by the phase transition layer is detected. The difference in the reflectance between a data-recorded area of the phase transition material film and a data-free area thereof is detected from the detected optical signal. Using the difference in the amount of reflected light calculated from the detected difference in reflectance, data can be reproduced from the optical recording medium.

Figure 4A:
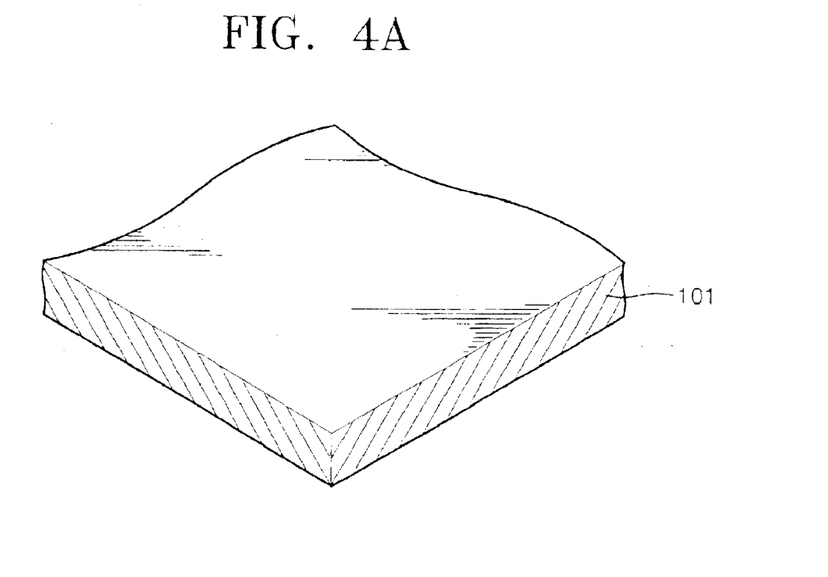
FIGS. 4A through 4K are perspective views for illustrating a method of manufacturing the optical recording medium according to the first embodiment of the present invention.
Figure 4B:
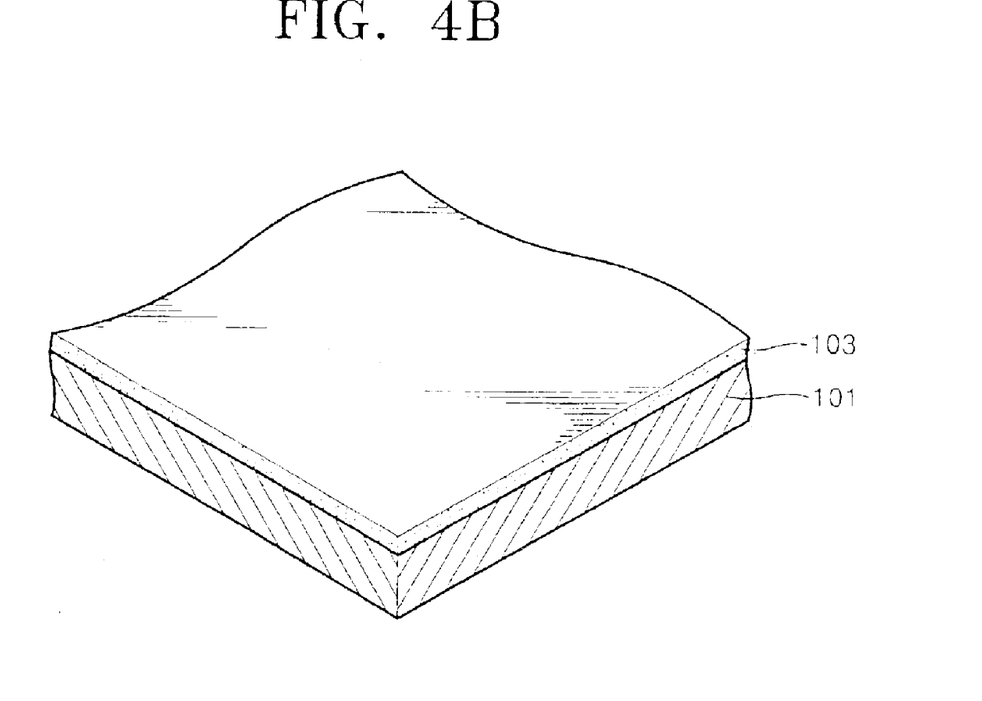
Figure 4C:
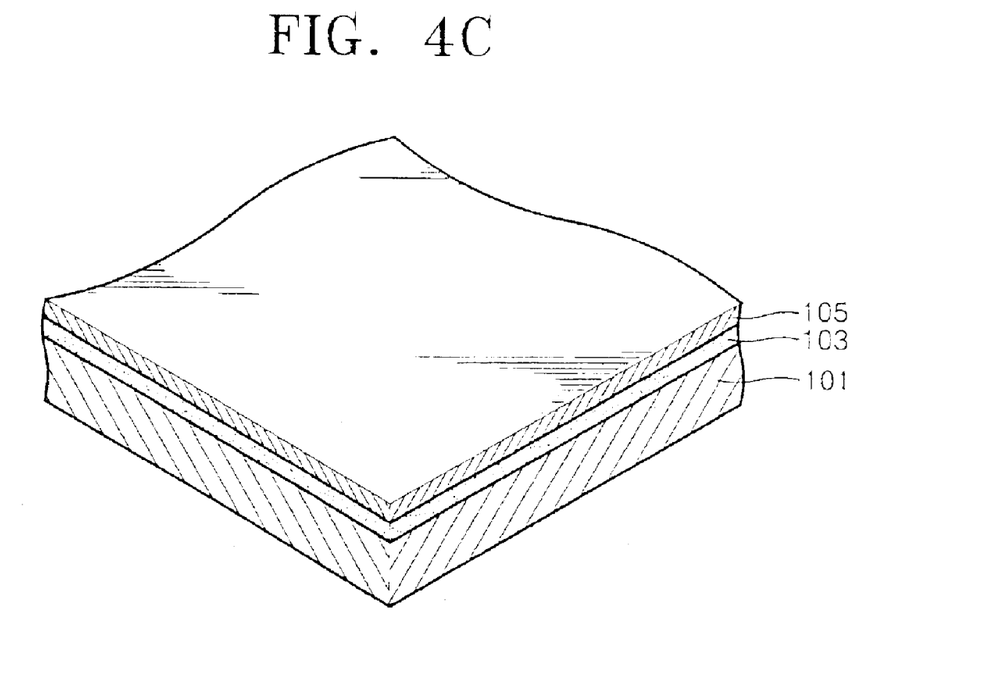

FIGS. 4A through 4K are perspective views for illustrating a method of manufacturing the optical recording medium according to the first embodiment of the present invention. First, as shown in FIG. 4A, a substrate 101 formed of polycarbonate (PC), glass, or silicon is prepared. Next, as shown in FIG. 4B, a phase transition material film 103 formed of a Ge—Te—Sb (GTS)-based alloy is deposited on the upper surface of the substrate 101. As shown in FIG. 4C, a sacrificial film 105 made of a metal such as Ta is deposited on the upper surface of the phase transition material film 103.

Figure 4D:
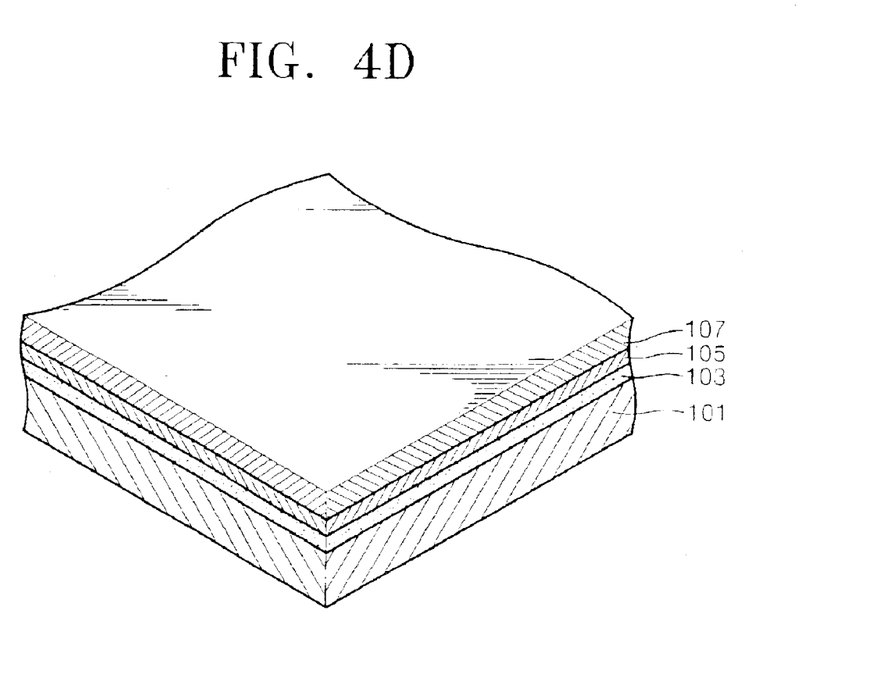
Figure 4E:
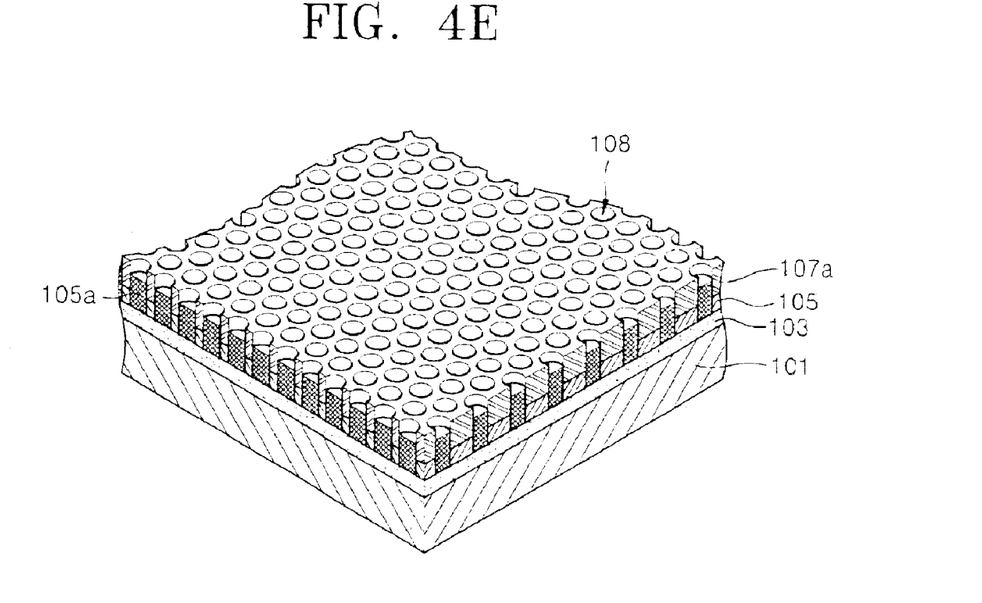

As shown in FIG. 4D, a metal film 107 made of aluminum or an aluminum alloy is deposited on the upper surface of the sacrificial film 105. As shown in FIG. 4E, the metal film 107 is anodized to be turned into a metal oxide film 107a having a plurality of holes 108.

Figure 5:
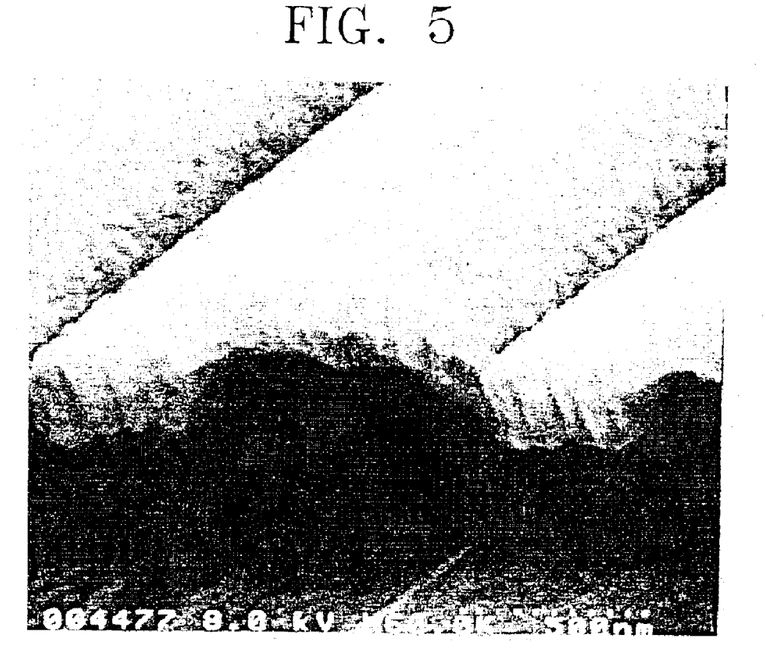
FIG. 5 is a scanning electron microscopy (SEM) picture showing a plurality of holes formed by first depositing aluminum on a polycarbonate substrate on which lands and grooves are formed and then anodizing the aluminum during a process of manufacturing the optical recording medium according to the first embodiment of the present invention.
Figure 6:
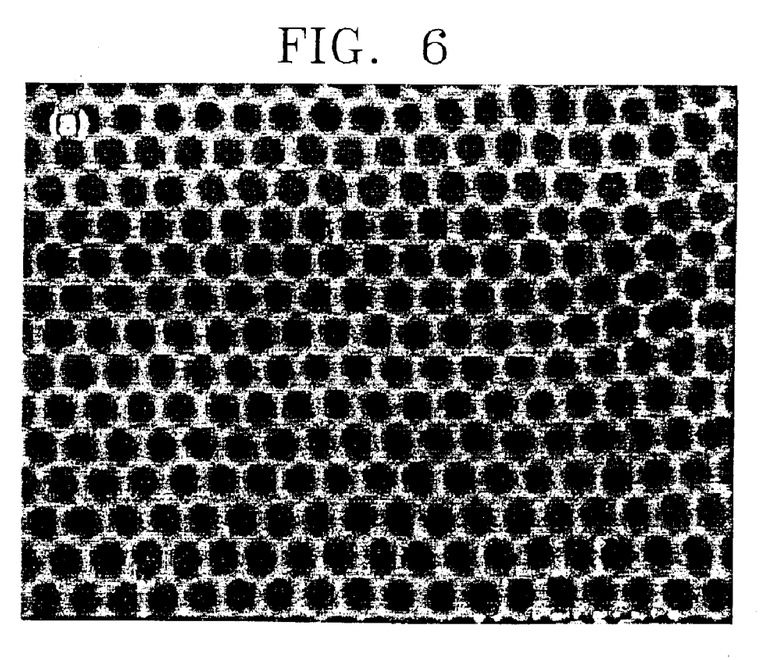
FIG. 6 is an SEM picture showing the top side of the polycarbonate substrate on which the plurality of holes of FIG. 5 are formed.

FIG. 5 is a scanning electron microscopy (SEM) picture showing a plurality of holes formed by first depositing aluminum on a polycarbonate substrate having a land-groove structure and then anodizing the aluminum. FIG. 6 is an SEM picture showing the top side of the polycarbonate substrate on which the plurality of holes of FIG. 5 are formed. It can be seen from FIGS. 5 and 6 that when aluminum is oxidized into alumina, a plurality of holes are regularly formed. The plurality of holes are arranged to have a honeycomb-like matrix structure to allow the largest surface area.

Referring back to FIG. 4E, the phase transition material film 103 and the sacrificial film 105 are sequentially stacked on the upper surface of the substrate 101, and the metal oxide film 107a in which a plurality of holes are arranged is formed on the upper surface of the sacrificial film 105. Portions of the sacrificial film 105 exposed through the holes 108 formed while the metal film 107 are oxidized by an oxidization solution. Consequently, oxide films 105a grow in a column shape from the sacrificial film 105 through the holes 108. If the sacrificial film 105 is formed of Ta, the oxide films 105a are formed of TaOx.

Figure 4F:
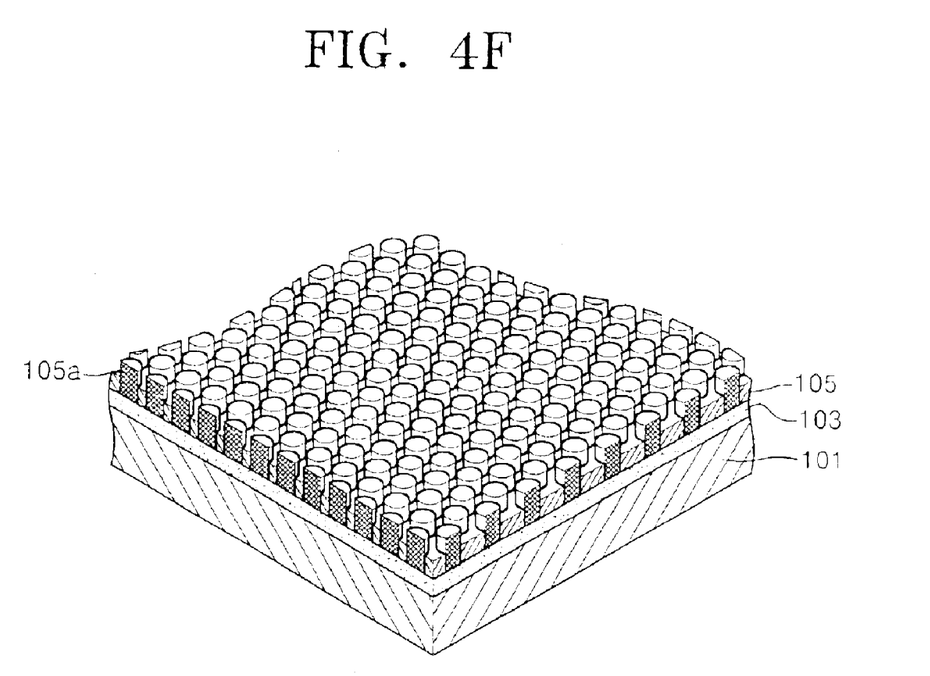
Figure 7:
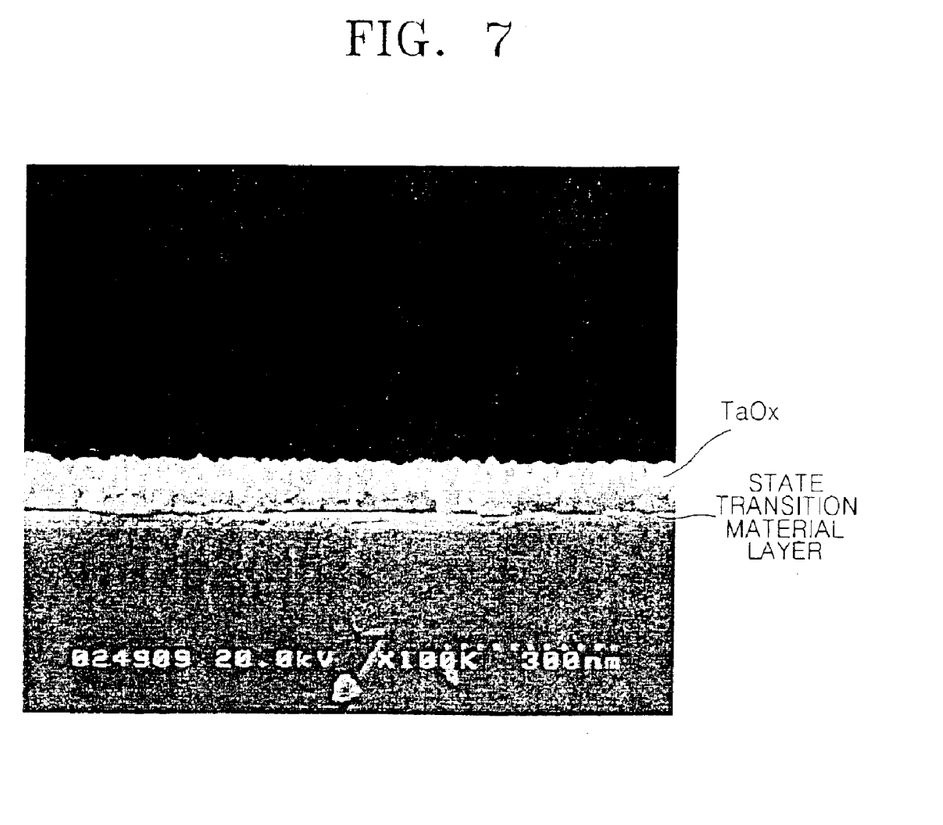
FIG. 7 is an SEM picture showing the polycarbonate substrate on which a plurality of TaOx columns remain after alumina is removed.
Figure 8:
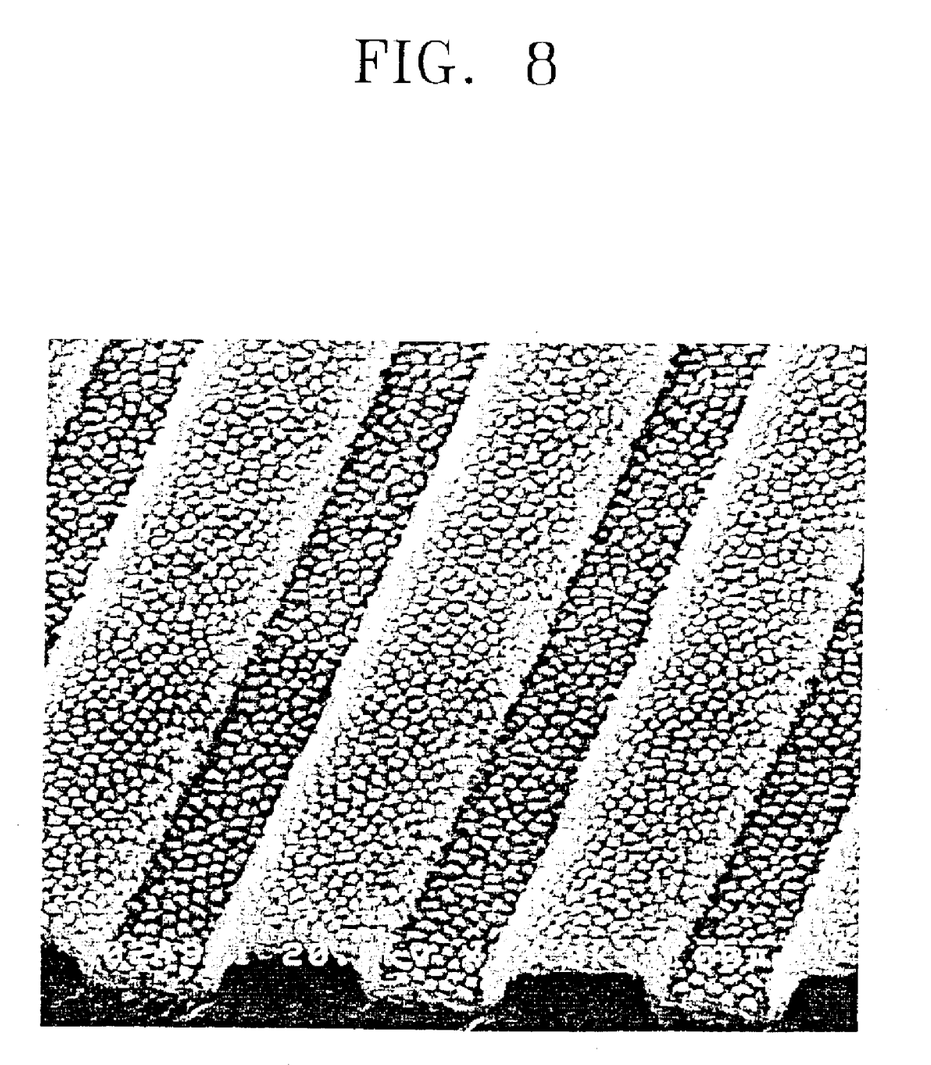
FIG. 8 is an SEM picture showing a structure in which a plurality of TaOx columns remain on a phase change film deposited on a polycarbonate substrate, after alumina ($Al_2O_3$) is etched out during the manufacture of the optical recording medium according to the first embodiment of the present invention.

As shown in FIG. 4F, the metal oxide film 107a is etched out until the sacrificial film 105 and the oxide films 105a of the sacrificial film 105 remain on the upper surface of the phase transition material film 103. If the sacrificial film 105 is completely oxidized, only the oxide films 105a of the sacrificial film 105 remain. FIG. 7 is an SEM picture showing the polycarbonate substrate on which a plurality of TaOx columns grown from a Ta sacrificial film are arranged on the upper surface of a phase change film after alumina ($Al_2O_3$) formed by anodizing aluminum is etched out. FIG. 8 is an SEM picture showing a structure in which a plurality of TaOx columns remain on a phase change film deposited on a polycarbonate substrate, after alumina ($Al_2O_3$) is etched out during the manufacture of the optical recording medium according to the first embodiment of the present invention.

Figure 4G:
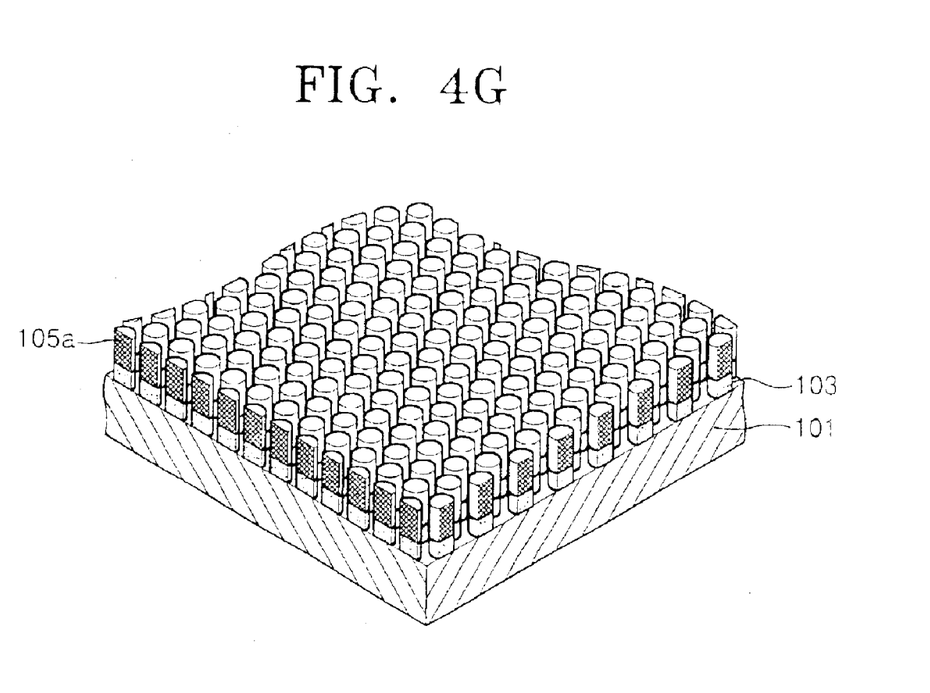

As shown in FIG. 4G, the phase transition material film 103 is patterned to have a honeycomb-like structure in which nanodots are arranged, by etching the sacrificial film 105 and the phase transition material film 103 using the oxide films 105a as a mask using an ion-milling method or a reactive ion etching (RIE) method.

Figure 4H:
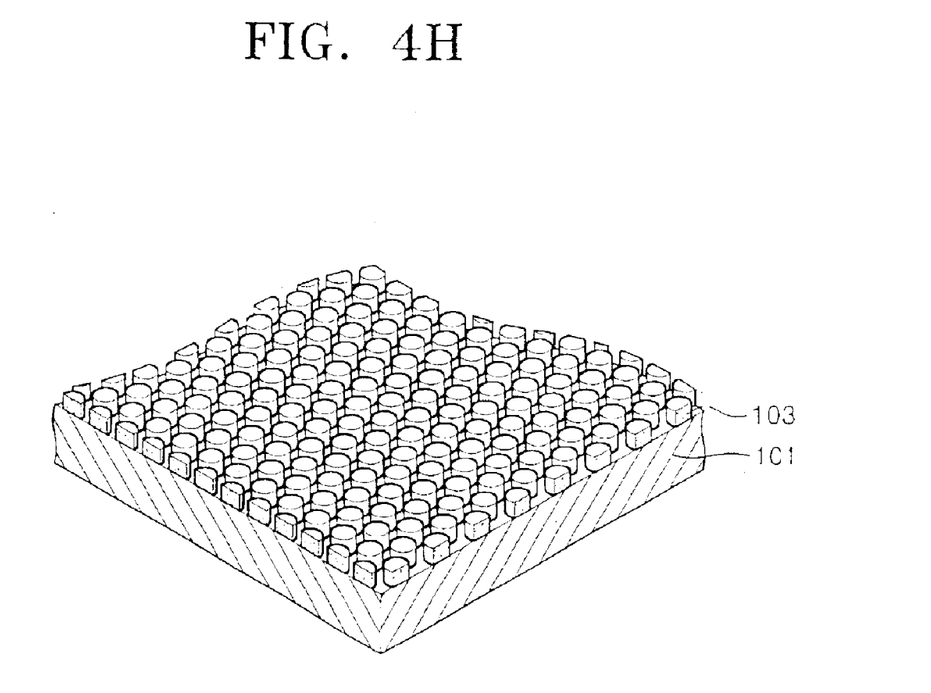
Figure 4I:
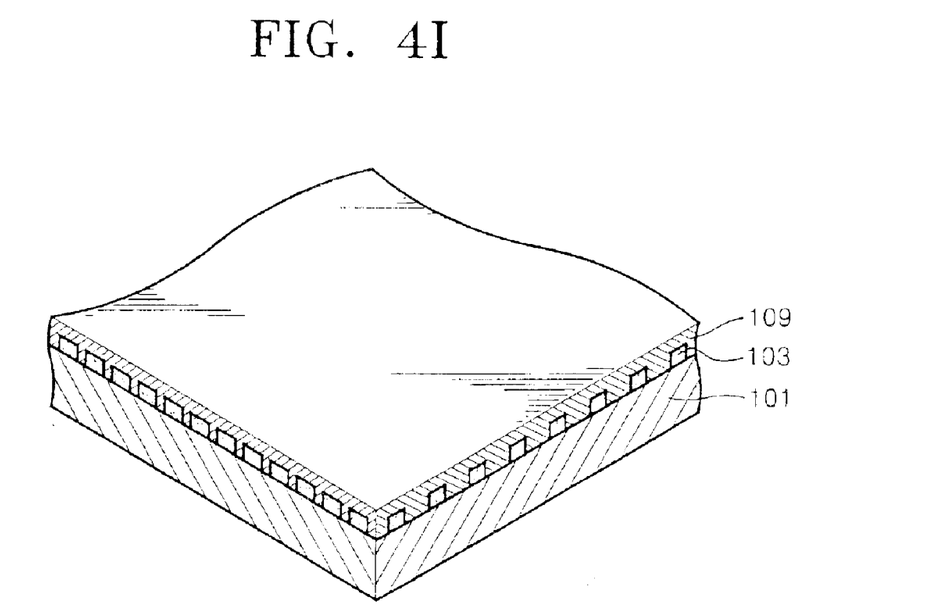
Figure 4J:
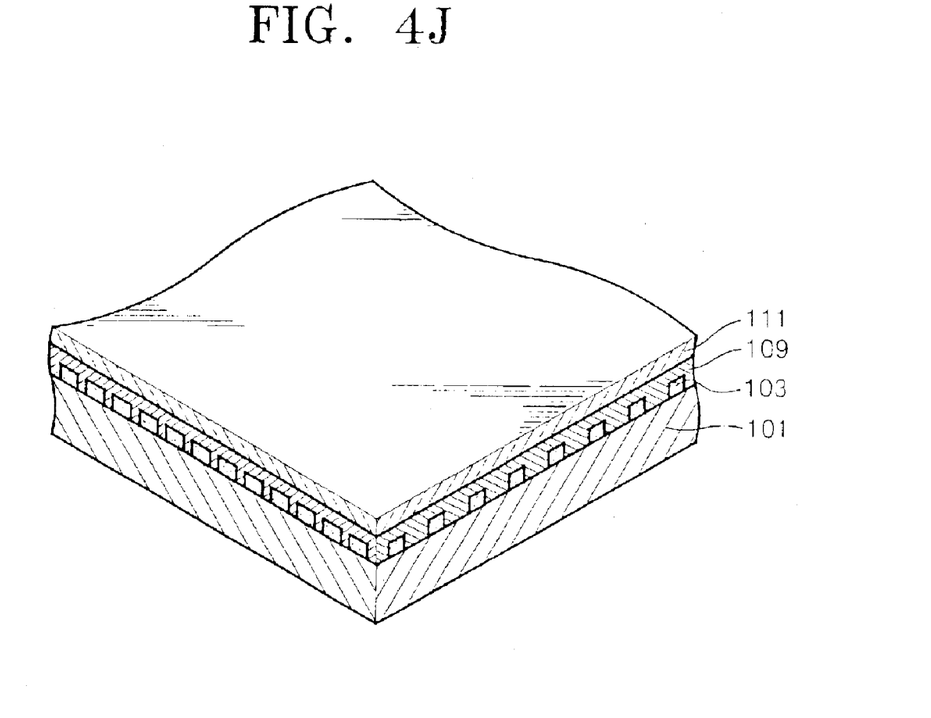
Figure 4K:
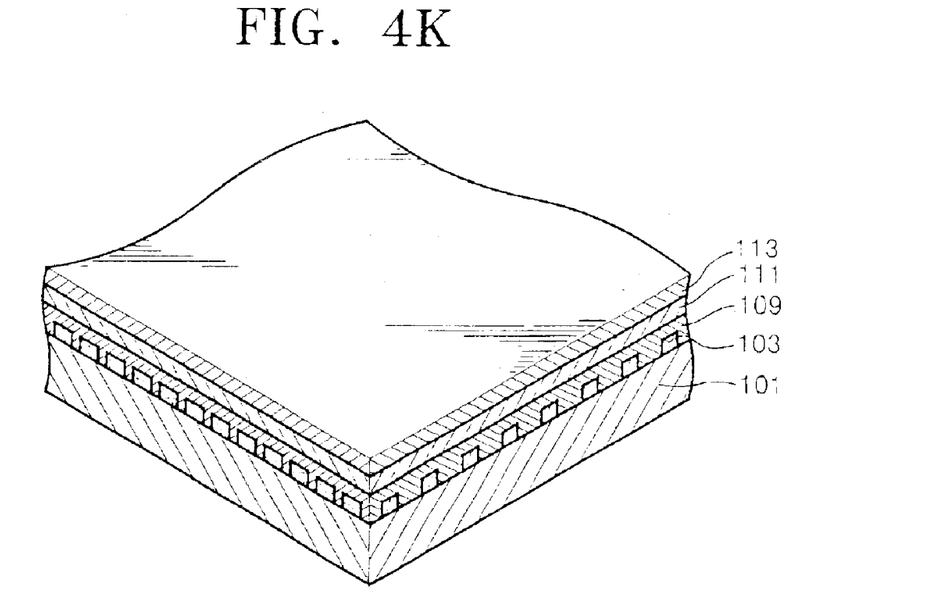

As shown in FIG. 4H, the oxide films 105a of the sacrificial film 105 are etched from the patterned phase transition material film 103 until only the patterned phase transition material film 103 remains. As shown in FIG. 4I, an insulation film 109 is deposited on the upper surface of the substrate 101 using a sputtering method or a chemical vapor deposition (CVD) method so as to cover the patterned phase transition material film 103. Here, the insulation film 109 is formed of $SiO_2$—ZnS. Next, as shown in FIG. 4J, a reflection film 111 is formed of an aluminum (Al) alloy or a silver (Ag) alloy on the upper surface of the insulation film 109. As shown in FIG. 4K, a protection film 113 is deposited on the upper surface of the reflection film 111. In this way, the optical recording medium according to the first embodiment having the phase transition material film 103 with a matrix structure in which nanodots are regularly arranged can be completely manufactured.

In the optical recording media according to the above-described embodiments of the present invention, a phase transition material film is patterned to have nanodot-shaped columns, more preferably, has a honeycomb-like matrix structure. Hence, the enlargement of a data recorded area is prevented, and accordingly, the recording density is significantly increased. Also, because the optical recording media according to the above-described embodiments of the present invention can record data using a lens having a low numerical aperture and low energy light, a light source to be used is not limited to a specific type. Because a high heat-resisting substrate is not needed, there is a wide choice for substrates.

In the manufacture of an optical recording medium according to the present invention, a phase transition material film can be simply patterned without performing a photolithographic process because the oxide film of a sacrificial film having self-assembled columns is used as a mask. The optical recording medium manufactured in this way can record and reproduce data using an existing optical recording/reproducing system.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the substrate, the reflection film, the phase transition material film, the metal film, the sacrificial film, the insulation film, and the protection film can be formed of materials other than the materials mentioned in the specification if they have similar properties to those of the mentioned materials.

What is claimed is:

1. A method of manufacturing an optical recording medium, the method comprising:
   sequentially stacking a phase transition material film, a sacrificial film, and a metal film on a substrate;
   anodizing the metal film to form a metal oxide film having a plurality of holes and anodizing portions of the sacrificial film exposed through the holes to form oxide films;
   patterning the phase transition material film by removing the metal oxide film and by etching the sacrificial film and the phase transition material film using the oxide films of the sacrificial film as a mask; and
   removing the oxide films of the sacrificial film and depositing an upper insulation film, a reflection film, and a protection film on the upper surface of the patterned phase transition material film.

2. The method of claim 1, further comprising forming a lower insulation film between the substrate and the phase transition film.

3. The method of claim 1, wherein the substrate has a land-groove structure in which lands are arranged alternately with grooves.

4. The method of claim 1, wherein the substrate is formed of any of polycarbonate (PC), glass, and silicon.

5. The method of claim 1, wherein the reflection film is formed of one of an aluminum (Al) alloy and a silver (Ag) alloy.

6. The method of claim 1, wherein the phase transition material film is formed of one of Ge—Te—Sb (GTS) or an alloy containing GTS.

7. The method of claim 1, wherein the sacrificial film is formed of Ta.

8. The method of claim 1, wherein the metal film is formed of one of Al or an Al alloy.

9. The method of claim 1, wherein the upper insulation film is formed of $SiO_2$—ZnS.

10. The method of claim 2, wherein the lower insulation film is formed of $SiO_2$—ZnS.

11. The method of claim 1, wherein the protection film is formed of PC.

12. The method of claim 1, wherein the phase transition material film, the sacrificial film, and the metal film are deposited using one of a chemical vapor deposition method and a sputtering method.

13. The method of claim 1, wherein the upper insulation film and the reflection film are deposited using one of a chemical vapor deposition method and a sputtering method.

14. The method of claim 2, wherein the lower insulation film is deposited using one of a chemical vapor deposition method and a sputtering method.

15. The method of claim 1, wherein while the sacrificial film is being oxidized, parts of the oxidized sacrificial film grow into the holes of the metal film.

16. The method of claim 1, wherein the phase transition material film is patterned to have a matrix structure in which a plurality of nanodot columns are arranged.

17. The method of claim 16, wherein the nanodot columns are arranged to have a honeycomb-like structure.

18. A method of manufacturing an optical recording medium, the method comprising:
   sequentially stacking a reflection film, a phase transition material film, a sacrificial film, and a metal film on a substrate;
   anodizing the metal film to form a metal oxide film having a plurality of holes and anodizing portions of the sacrificial film exposed through the holes to form oxide films;
   patterning the phase transition material film by removing the metal oxide film and by etching the sacrificial film and the phase transition material film using the oxide films of the sacrificial film as a mask; and
   removing the oxide films from the sacrificial film and depositing an insulation film and a protection film on the upper surface of the patterned phase transition material film.

19. The method of claim 18, wherein the substrate has a land-groove structure in which lands are arranged alternately with grooves.

20. The method of claim 18, wherein the substrate is formed of any of PC, glass, and silicon.

21. The method of claim 18, wherein the reflection film is formed of one of an Al alloy and an Ag alloy.

22. The method of claim 18, wherein the phase transition material film is formed of one of Ge—Te—Sb (GTS) or an alloy containing GTS.

23. The method of claim 18, wherein the sacrificial film is formed of Ta.

24. The method of claim 18, wherein the metal film is formed of one of Al or an Al alloy.

25. The method of claim 18, wherein the insulation film is formed of $SiO_2$—ZnS.

26. The method of claim 18, wherein the protection film is formed of PC.

27. The method of claim 18, wherein the reflection film, the phase transition material film, the sacrificial film, and the metal film are deposited using one of a chemical vapor deposition method and a sputtering method.

28. The method of claim 18, wherein the insulation film is deposited using one of a chemical vapor deposition method and a sputtering method.

29. The method of claim 18, wherein while the sacrificial film is being oxidized, parts of the oxidized sacrificial film grow into the holes of the metal film to obtain the oxide films.

30. The method of claim 18, wherein the phase transition material film is patterned to have a matrix structure in which a plurality of nanodot columns are arranged.

31. The method of claim 30, wherein the nanodot columns are arranged to have a honeycomb-like structure.

32. An optical recording medium comprising:

a substrate a phase transition material film patterned into a plurality of portions on the substrate;

an upper insulation film deposited on the substrate to cover the phase transition material film portions;

a reflection film deposited on the upper insulation film; and a protection film formed on the upper surface of the reflection film, wherein the phase transition material film has a matrix structure in which a plurality of nanodot columns are arranged, and wherein the nanodot columns are arranged to have a honeycomb-like structure.

33. An optical recording medium comprising:

a substrate;

a reflection film deposited on the substrate;

a phase transition material film patterned into a plurality of portions on the reflection film;

an insulation film deposited on the reflection film to cover the phase transition material film portions; and a protection film formed on the upper surface of the insulation film.

34. The optical recording medium of claim 33, wherein the substrate has a land-groove structure in which lands are arranged alternately with grooves.

35. The optical recording medium of claim 33, wherein the substrate is formed of any of PC, glass, and silicon.

36. The optical recording medium of claim 33, wherein the reflection film is formed of one of an Al alloy and an Ag alloy.

37. The optical recording medium of claim 33, wherein the phase transition material film portions are formed of one of Ge—Te—Sb (GTS) or an alloy containing GTS.

38. The optical recording medium of claim 33, wherein the metal film is formed of one of Al or an Al alloy.

39. The optical recording medium of claim 33, wherein the insulation film is formed of $SiO_2$—ZnS.

40. The optical recording medium of claim 33, wherein the protection film is formed of PC.

41. An optical recording medium comprising:

a substrate;

a reflection film deposited on the substrate;

a phase transition material film patterned on the reflection film;

an insulation film deposited on the reflection film to cover the phase transition material film; and a protection film formed on the upper surface of the insulation film, wherein the phase transition material film has a matrix structure in which a plurality of nanodot columns are arranged.

42. The optical recording medium of claim 41, wherein the nanodot columns are arranged to have a honeycomb-like structure.

43. The optical recording medium according to claim 33, wherein the reflection film is interposed between the substrate and the patterned phase transition material film.

44. The optical recording medium of claim 32, wherein the phase transition material film portions are arranged in a matrix pattern.

45. The optical recording medium of claim 33, wherein the phase transition material film portions are arranged in a matrix pattern.

* * * * *